United States Patent
Cho et al.

(10) Patent No.: US 9,308,797 B2
(45) Date of Patent: Apr. 12, 2016

(54) SUSPENSION CONTROL SYSTEM AND METHOD THEREOF

(71) Applicant: Hyundai Motor Company, Seoul (KR)

(72) Inventors: Jae Sung Cho, Gyeonggi-do (KR); Young Sik Yoon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/245,114

(22) Filed: Apr. 4, 2014

(65) Prior Publication Data
US 2015/0112550 A1    Apr. 23, 2015

(30) Foreign Application Priority Data
Oct. 17, 2013   (KR) ........................ 10-2013-0123951

(51) Int. Cl.
*B60G 17/06* (2006.01)
*B60G 17/016* (2006.01)

(52) U.S. Cl.
CPC ............ *B60G 17/0162* (2013.01); *B60G 17/06* (2013.01); *B60G 2400/0521* (2013.01); *B60G 2400/0523* (2013.01); *B60G 2400/40* (2013.01); *B60G 2500/10* (2013.01)

(58) Field of Classification Search
None
See application file for complete search history.

(56) References Cited

U.S. PATENT DOCUMENTS

| | | | |
|---|---|---|---|
| 2003/0047994 A1 | 3/2003 | Koh | |
| 2006/0006017 A1* | 1/2006 | Tsukasaki et al. | 180/233 |

FOREIGN PATENT DOCUMENTS

| | | |
|---|---|---|
| JP | 2009-196586 A | 9/2009 |
| JP | 2011-173465 A | 9/2011 |
| JP | 2013-049362 A | 3/2013 |
| KR | 10-0709011 | 4/2007 |
| KR | 10-2007-0047907 | 5/2007 |
| KR | 10-0808422 B1 | 2/2008 |
| KR | 10-0827689 | 5/2008 |

* cited by examiner

*Primary Examiner* — Rami Khatib
(74) *Attorney, Agent, or Firm* — Mintz Levin Cohn Ferris Glovsky and Popeo, P.C.; Peter F. Corless

(57) ABSTRACT

A suspension control system and a method thereof are provided. Steering characteristics (e.g., under-steering and over-steering) of a running vehicle are analyzed to calculate lateral force of wheels and normal load (or normal force) of the wheels is calculated based on the lateral force. In addition, a current that corresponds to a total current value obtained by adding a yaw control current value corresponding to the normal force and a roll control current value is applied to a damper of the corresponding vehicles to perform roll control and yaw control of the vehicle.

22 Claims, 4 Drawing Sheets

SUSPENSION CONTROL SYSTEM AND METHOD THEREOF

CROSS-REFERENCE TO RELATED APPLICATION

This application is based on and claims priority from Korean Patent Application No. 10-2013-0123951, filed on Oct. 17, 2013 in the Korean Intellectual Property Office, the disclosure of which is incorporated herein in its entirety by reference.

BACKGROUND

1. Field of the Invention

The present invention relates to a suspension control system and a method thereof, and more particularly, to a suspension control system that performs roll control and yaw control on a vehicle, and a method thereof.

2. Description of the Prior Art

A suspension system installed within a vehicle has a damper on each individual wheel to improve ride comfort and running performance. Such a damper is installed between a vehicle body and a driving wheel to be parallel to a spring to absorb vibrations of vehicle generated by impact applied to the spring. In particular, a damper operates to reduce kinetic energy in a vertical direction.

Recently, vehicles have increasingly employed a variable damper whose damping force is controllable to further enhance ride comfort. In particular, damping force is adjusted by a control logic. A related art electronic controlled suspension (ECS) system that performs a control logic performs roll control using a steering angle sensor, a yaw rate sensor, a lateral acceleration sensor, a wheel speed sensor, a longitudinal vehicle speed sensor, and the like, installed therein. However, when a road is slippery or when rapid steering is required, under-steering or over-steering may occur. Accordingly, the related art ECS system simply performs roll control and may not be capable of providing optimal running stability.

SUMMARY

The present invention provides a suspension control system that may perform roll control and yaw control of a vehicle by analyzing steering characteristics (e.g., under-steering and over-steering) of a running vehicle to calculate corresponding lateral force of a wheel, calculating a normal load (hereinafter, referred to as 'normal force') of the wheels based on the lateral force, and applying a current that corresponds to a total current value obtained by adding a current value (e.g., yaw control current value) that corresponds to the normal force and a roll control current value to a damper of the corresponding wheels, and a method thereof.

In particular, the present invention provides a suspension control system that may include: a vehicle information storage configured to store a distance from the vehicle center of mass to front wheels, distance from the vehicle center of mass to rear wheels, a vehicle mass m, a wheel base L, and a tire lateral force deflection sensitivity coefficient K based on a change in a load; a current value storage configured to store a yaw control current value based on normal force and a damper velocity; a running information collector configured to collect a steering angle, a vehicle velocity u, a yaw rate γ, and lateral acceleration $\ddot{y}$; a steering determining unit configured to determine steering characteristics of the vehicle; a yaw control current value detector configured to calculate lateral force of wheels based on the steering characteristics determined by the steering determining unit, calculate normal force of the wheels based on the lateral force, and subsequently detect a current value (e.g., yaw control current value) that corresponds to the normal force and a current damper velocity; a roll control current value detector configured to detect a roll control current value based on a damper characteristic curve; and a damper driver configured to apply a current that corresponds to the sum of the yaw control current value and the roll control current value to a corresponding damper.

In addition, the present invention provides a suspension control method that may include: determining, by a steering determining unit, steering characteristics of a vehicle; a first detecting operation in which when the vehicle is in the under-steering according to the determination result, a yaw control current value detector calculates lateral force of front wheels, calculates normal force of the front wheels based on the lateral force, and subsequently detects a yaw control current value that corresponds to the normal force and a current damper velocity; a second detecting operation in which when the vehicle is in the over-steering according to the determination result, the yaw control current value detector calculates lateral force of rear wheels, calculates normal force of the rear wheels based on the lateral force, and subsequently detects a yaw control current value that corresponds to the normal force and a current damper velocity; detecting, by a roll control current value detector, a roll control current value based on a damper characteristic curve; and applying, by a damper driver, a current that corresponds to the sum of the yaw control current value and the roll control current value to a corresponding damper.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1:
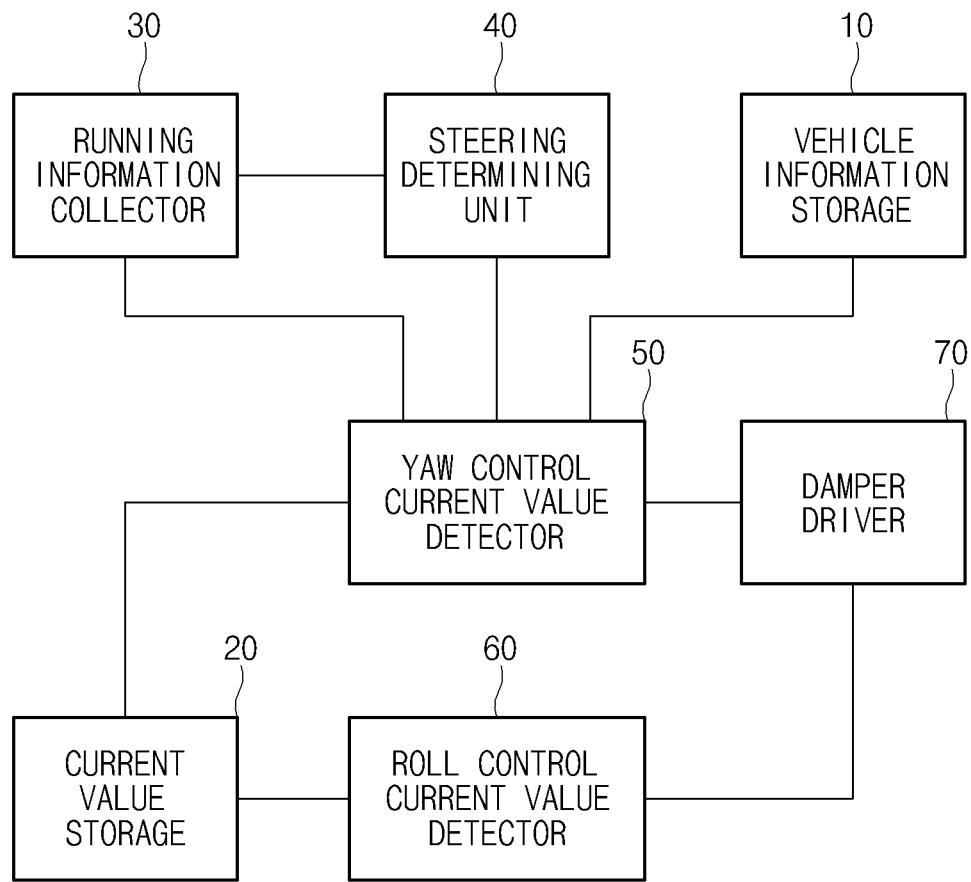
FIG. 1 is an exemplary block diagram of a suspension control system according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail with reference to the accompanying drawings.

FIG. 1 is an exemplary block diagram of a suspension control system according to an exemplary embodiment of the present invention. As illustrated in FIG. 1, a suspension control system according to an exemplary embodiment of the present invention includes a vehicle information storage 10, a current value storage 20, a running information collector 30, a steering determining unit 40, a yaw control current value detector 50, a roll control current value detector 60, a damper driver 70, and the like.

The respective elements will be described. First, the vehicle information storage 10 may be configured to store a distance (or wheel space) from a vehicle center of mass to a front wheel, a distance from the vehicle center of mass to a rear wheel, a vehicle mass m, a wheel base L, a tire lateral force deflection sensitivity coefficient K based on a change in a load. The current value storage 20 may be configured to store damper characteristic curve based on damping force and a damper velocity, and a yaw control current value based on normal force and a damper velocity.

Figure 2A:
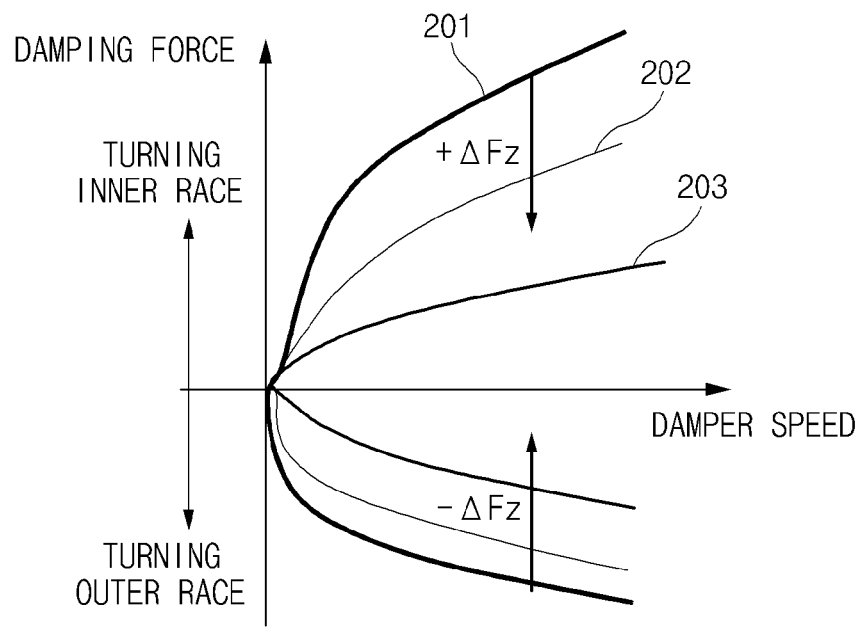
FIG. 2A is an exemplary graph illustrating a damper characteristic curve based on damping force and damper velocity according to an exemplary embodiment of the present invention.

Hereinafter the damper characteristic curve based on damping force and a damper velocity, and the yaw control current value based on normal force and a damper velocity will be described in detail with reference to FIGS. 2A and 2B. FIG. 2A is an exemplary graph illustrating a damper characteristic curve based on damping force and damper velocity according to an exemplary embodiment of the present invention, and FIG. 2B is an exemplary graph illustrating a yaw control current value based on normal force and a damper velocity according to an exemplary embodiment of the present invention.

As illustrated in FIG. 2A, a curve 201 indicates controlling a damper hard, in which the damper is controlled with a current of about 0.3 A. A curve 202 indicates controlling the damper in a medium manner, in which the damper is controlled with a current of about 0.8 A. A curve 203 indicates controlling the damper softly, in which the damper is controlled with a current of about 1.3 A. In particular, with respect to each of the front wheels and rear wheels, a curve having a positive damping force may be applied to a cornering direction inner wheel, and a curve having a negative damping force may be applied to a cornering direction outer wheel.

Figure 2B:
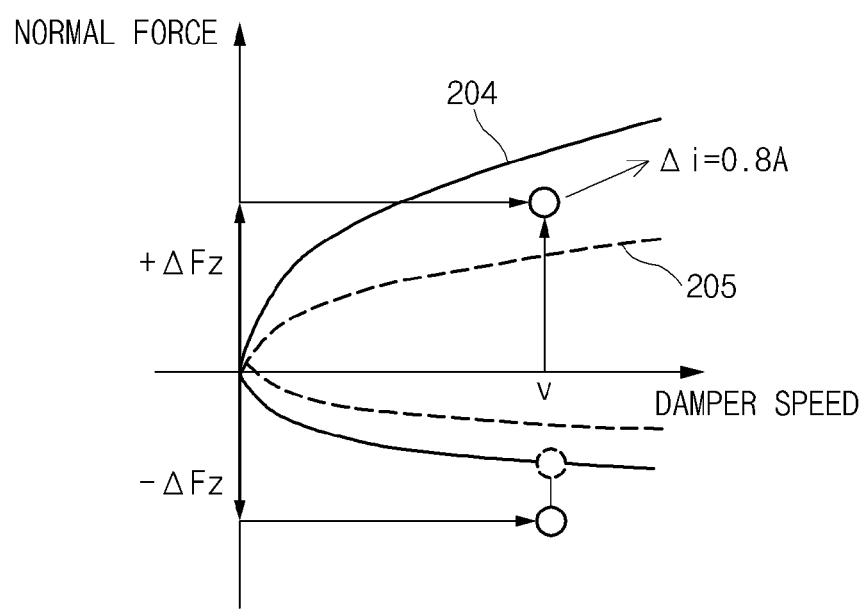
FIG. 2B is an exemplary graph illustrating a yaw control current value based on normal force and a damper velocity according to an exemplary embodiment of the present invention.

A range of a yaw control current value may be determined based on the foregoing damper characteristic curves as illustrated in FIG. 2B. In particular, a maximum value of the yaw control current value may be about 1.0 A, a difference between the current value 0.3 A of the hard curve 201 among the damper characteristic curves and the current value 1.3 A of the soft curve 203 among the damper characteristic curves. A curve 205 may be an auxiliary curve for calculating a yaw control current value, which may be about 0.5 A, a difference between the current value 0.3 A of the hard curve 201 and the current value 0.8 A of the middle curve 202. Thus, a curve 204 indicates a current of about 1.0 A, a maximum value of the yaw control current value, and the curve 205 indicates a yaw control current value of about 0.5 A. For example, FIGS. 2A and 2B show that when normal force is $\Delta F_z$ and a damper velocity is v, a raw control current value $\Delta i$ may be about 0.8 A through an interval between the curves 204 and 205. Meanwhile, in the event of roll control of the vehicle, since the damper may be controlled in a hard manner, a roll control current value may become about 0.3 A. As a result, a current of about 1.1 A that corresponds to the sum of the roll control current value 0.3 A and the yaw control current value 0.8 A may be applied to the damper to improve running performance of the vehicle.

As shown in the exemplary graph (FIG. 2B) of the yaw control current value, similar to the damper characteristic curve, a curve having a positive normal force may be applied to a cornering direction inner wheel and a curve having negative normal force may be applied to a cornering direction outer wheel with respect to each of the front wheels and rear wheels. However, when normal force applied to the cornering direction outer wheel exceeds the curve 204, a maximum value of about 1.0 A may be applied as illustrated in FIG. 2B.

The running information collector 30 may be configured to collect a steering angle, a vehicle velocity u, a yaw rate ($\gamma$) and lateral acceleration $\ddot{y}$ through the vehicle network. In particular, the vehicle network includes a controller area network (CAN), a local interconnect network (LIN), FlexRay, media oriented system transport (MOST), and the like. The steering determining unit 40 may be operated by a processor to determine whether the vehicle is in the under-steering or over-steering based on the vehicle velocity, the steering angle, and the yaw rate collected by the running information collector 30. In other words, the processor may be configured to obtain a steering angle, a vehicle velocity u, a yaw rate (γ) and lateral acceleration $\ddot{y}$ through the vehicle network to determine whether the vehicle is in the under-steering or over-steering. In addition, the steering determining unit 40 may be configured to calculate a yaw rate using the vehicle velocity and the steering angle and subsequently compare the calculated yaw rate with the yaw rate collected by the running information collector 30 to recognize whether the vehicle is in the over-steering or under-steering state.

A technique of calculating a yaw rate using a vehicle velocity and a steering angle is a known art, thus a detailed description thereof will be omitted. In general, when cornering force of front wheels is increased while the vehicle is turning, since turning moment also known as generated yaw moment (e.g., torque) in a direction in which a vehicle turns generated by the front wheels becomes greater than yaw moment generated by rear wheels, a front portion of the vehicle may move to a side in which a turning radius is reduced, causing an over-steering phenomenon. Conversely, when the yaw moment generated by the rear wheels is increased, the opposite phenomenon occurs to cause under-steering. Cornering force causing the over-steering or under-steering phenomenon is mainly increased substantially in proportion to a side slip angle of a tire, and may also be influenced by a shared load of a tire, air pressure and a type of suspension, roll stiffness of a chassis spring, and the like.

The yaw control current value detector 50 may be configured to calculate lateral force of wheels based on the steering characteristics determined by the steering determining unit 40, calculate normal load (or normal force) of the wheels based on the lateral force, and subsequently detect a current value that corresponds to the normal force (e.g., yaw control current value). When the steering determining unit 40 determines that the vehicle is in the under-steering, the yaw control current value detector 50 (e.g., the processor) may be configured to calculate the lateral force of the front wheels, calculate normal force of the front wheels based on the calculated lateral force of the front wheels, and subsequently detect a current value that corresponds to the normal force of the front wheels from the current value storage 20. The yaw control current value detector 50 may be configured to detect a damper velocity in real time. Further, when the steering determining unit 40 determines that the vehicle is in the over-steering, the yaw control current value detector 50 may be configured to calculate lateral force of the rear wheels, calculate normal force of the rear wheels based on the calculated lateral force of the rear wheels, and subsequently detect a current value that corresponds to the normal force of the rear wheels from the current value storage 20. The yaw control current value detector 50 may be configured to detect a damper velocity in real time.

Figure 3:
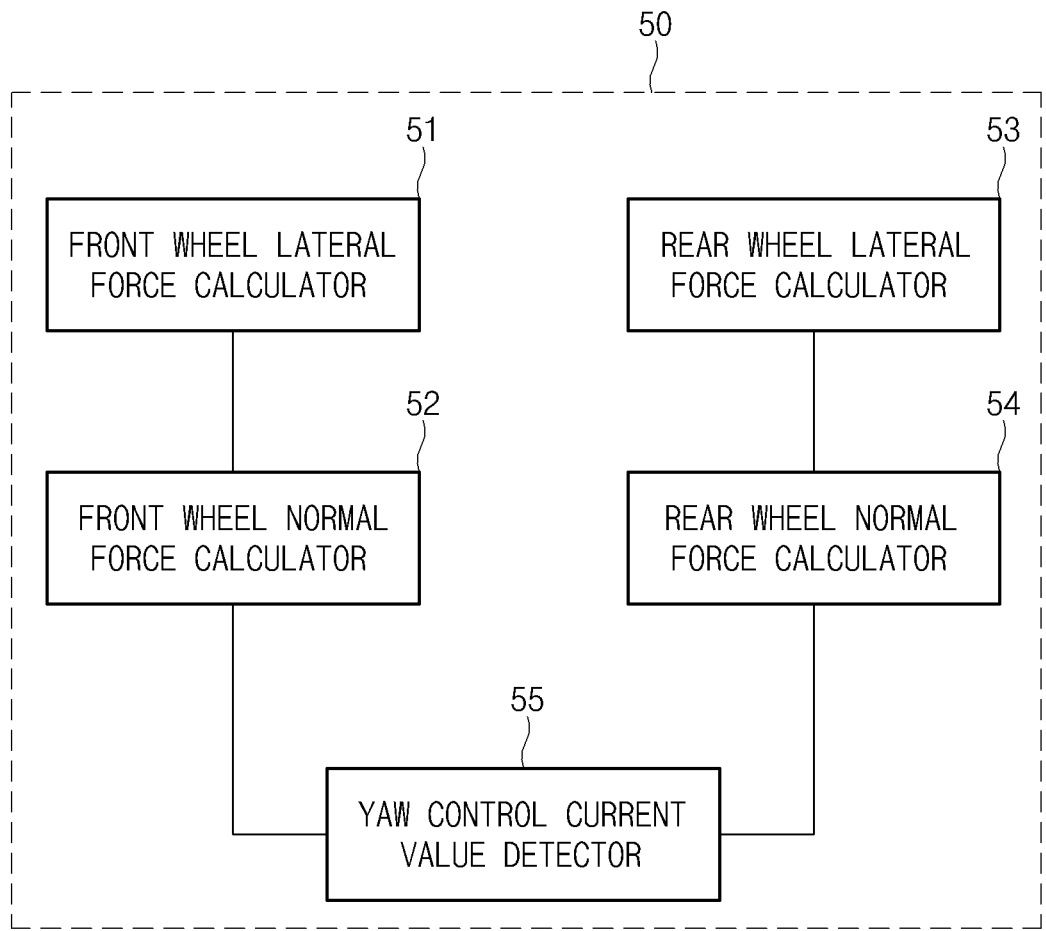
FIG. 3 is an exemplary detailed block diagram of a yaw control current value detector according to an exemplary embodiment of the present invention.

Hereinafter, a detailed configuration of the yaw control current value detector 50 will be described with reference to FIG. 3. As illustrated in FIG. 3, the yaw control current value detector 50 may include a front wheel lateral force calculator 51, a front wheel normal force calculator 52, a rear wheel lateral force calculator 53, a rear wheel normal force calculator 54, and a yaw control current value detector 55. The yaw control current value detector 50 may be operated by the processor.

In particular, the yaw control current value detector 50 may be configured to calculate normal a force of the front wheels and the rear wheels based on yaw rate or lateral acceleration. A method of calculating normal force of the front wheels and the rear wheels based on the lateral acceleration will be descried as a first exemplary embodiment and a method of calculating normal force of the front wheels and the rear wheels based on the yaw rate will be described as a second exemplary embodiment.

First Exemplary Embodiment

First, in response to determining that under-steering has occurred, the front wheel lateral force calculator 51 may be configured to calculate lateral force $F_{yf0}$ of the front wheels based on Equation 1 below.

$$2Y_f = mg\frac{L_r}{L}\ddot{y} = F_{yf0} \qquad \text{Equation 1}$$

wherein, m is a vehicle mass, g is gravitational acceleration, L is a wheel base of the vehicle, Lr is distance from the vehicle center of mass to the rear wheels, and $\ddot{y}$ is lateral acceleration.

The front wheel normal force calculator 52 may be configured to calculate normal force of the front wheels based on lateral force of the front wheels calculated by the front wheel lateral force calculator 51. In particular, the front wheel normal force calculator 52 may be configured to calculate normal force $\Delta F_{zf}$ of the front wheels based on Equation 2 below.

$$\Delta F_{zf} = \pm F_{zf0}\sqrt{\frac{1}{K}\frac{\Delta F_{yf}}{F_{yf0}}} = \pm mg\frac{L_r}{L}\sqrt{\frac{1}{K}\frac{\Delta F_{yf}}{mg\frac{L_r}{L}\ddot{y}}} = \qquad \text{Equation 2}$$

$$\pm \sqrt{\frac{1}{K}\frac{\Delta F_{yf}}{\ddot{y}}\frac{mgL_r}{L}}$$

wherein, K is a tire lateral force deflection sensitivity coefficient based on a change in a load, and $\Delta F_{yf}$ is a front wheel tire lateral force for creating additional yaw moment.

The yaw control current value detector 55 may be configured to detect a yaw control current value from a yaw control current value graph stored in the current value storage 20, based on the normal force calculated by the front wheel normal force calculator 52 and the already known damper velocity. In response to determining that over-steering has occurred, the rear wheel lateral force calculator 53 may be configured to calculate lateral force $F_{yr0}$ of the rear wheels based on Equation 3 below.

$$2Y_r = mg\frac{L_f}{L}\ddot{y} = F_{yr0} \qquad \text{Equation 3}$$

wherein, Lf is a distance from the vehicle center of mass to the front wheels.

The rear wheel normal force calculator 54 may be configured to calculate normal force of the rear wheels based on the lateral force of the rear wheels calculated by the rear wheel lateral force calculator 53. In particular, the rear wheel normal force calculator 54 may be configured to calculate normal force $\Delta F_{zr}$ of the rear wheels based on Equation 4 below.

$$\Delta F_{zr} = \pm F_{zr0}\sqrt{\frac{1}{K}\frac{\Delta F_{yr}}{F_{yr0}}} = \pm mg\frac{L_f}{L}\sqrt{\frac{1}{K}\frac{\Delta F_{yr}}{mg\frac{L_f}{L}\ddot{y}}} =$$
$$\pm\sqrt{\frac{1}{K}\frac{\Delta F_{yr}}{\ddot{y}}\frac{mgL_f}{L}}$$

Equation 4 wherein, $\Delta F_{yr}$ is a rear wheel tire lateral force for creating additional yaw moment.

The yaw control current value detector 55 may be configured to detect a yaw control current value from the yaw control current value graph stored in the current value storage 20, based on the normal force calculated by the rear wheel normal force calculator 54 and the already known damper velocity.

Second Exemplary Embodiment

First, in response to determining that under-steering has occurred, the front wheel lateral force calculator 51 may be configured to calculate lateral force $F_{yf0}$ of the front wheels based on Equation 5 below.

$$F_{yf0} = \frac{L_r}{L_f + L_r}m\gamma u$$

Equation 5 wherein, $L_f$ is a distance from the vehicle center of mass to front wheels, Lr is a distance from the vehicle center of mass to the rear wheels, m is a vehicle mass, γ is a yaw rate, and u is a vehicle velocity.

The front wheel normal force calculator 52 may be configured to calculate normal force of the front wheels based on lateral force of the front wheels calculated by the front wheel lateral force calculator 51. In particular, the front wheel normal force calculator 52 may be configured to calculate normal force $\Delta F_{zf}$ of the front wheels based on Equation 6 below.

$$\Delta F_{zf} = \pm F_{zf0}\sqrt{\frac{1}{K}\frac{\Delta F_{yf}}{F_{yf0}}} = \pm g\sqrt{\frac{1}{K}\frac{\Delta F_{yf}}{\gamma u}\frac{L_r}{L_f + L_r}m}$$

Equation 6 wherein, K is a tire lateral force deflection sensitivity coefficient based on a change in a load, and $\Delta F_{yf}$ is a front wheel tire lateral force for creating additional yaw moment.

The yaw control current value detector 55 may be configured to detect a yaw control current value from the yaw control current value graph stored in the current value storage 20, based on the normal force calculated by the front wheel normal force calculator 52 and the already known damper velocity. In response to determining that over-steering has occurred, the rear wheel lateral force calculator 53 may be configured to calculate lateral force $F_{yr0}$ of the rear wheels based on Equation 7 below.

$$F_{yr0} = \frac{L_r}{L_f + L_r}m\gamma u$$

Equation 7

The rear wheel normal force calculator 54 may be configured to calculate a normal force of the rear wheels based on the lateral force of the rear wheels calculated by the rear wheel lateral force calculator 53. In particular, the rear wheel normal force calculator 54 may be configured to calculate normal force AF, of the rear wheels based on Equation 8 below.

$$\Delta F_{zr} = \pm F_{zr0}\sqrt{\frac{1}{K}\frac{\Delta F_{yr}}{F_{yr0}}} = \pm g\sqrt{\frac{1}{K}\frac{\Delta F_{yr}}{\gamma u}\frac{L_r}{L_f + L_r}m}$$

Equation 8 wherein, $\Delta F_{yr}$ is a rear wheel tire lateral force for creating additional yaw moment.

The yaw control current value detector 55 may be configured to detect a yaw control current value from the yaw control current value graph stored in the current value storage 20, based on the normal force calculated by the rear wheel normal force calculator 54 and the already known damper velocity. The roll control current value detector 60 may be configured to detect a roll control current value based on the damper characteristic curve stored in the current value storage 20. In particular, since the damper may be controlled in a hard manner during roll control, the roll control current value detector 60 may be configured to detect a fixed current value (e.g., about 0.3 A). The damper driver 70 may be configured to apply a current that corresponds to a total current value obtained by adding the current value detected by the yaw control current value detector 50 and the current value detected by the roll control current value detector 60, to the damper to drive the damper. In other words, a driver (e.g., a controller) may be configured to apply the current calculated by the processor within the controller to the damper to operate the damper.

Figure 4:
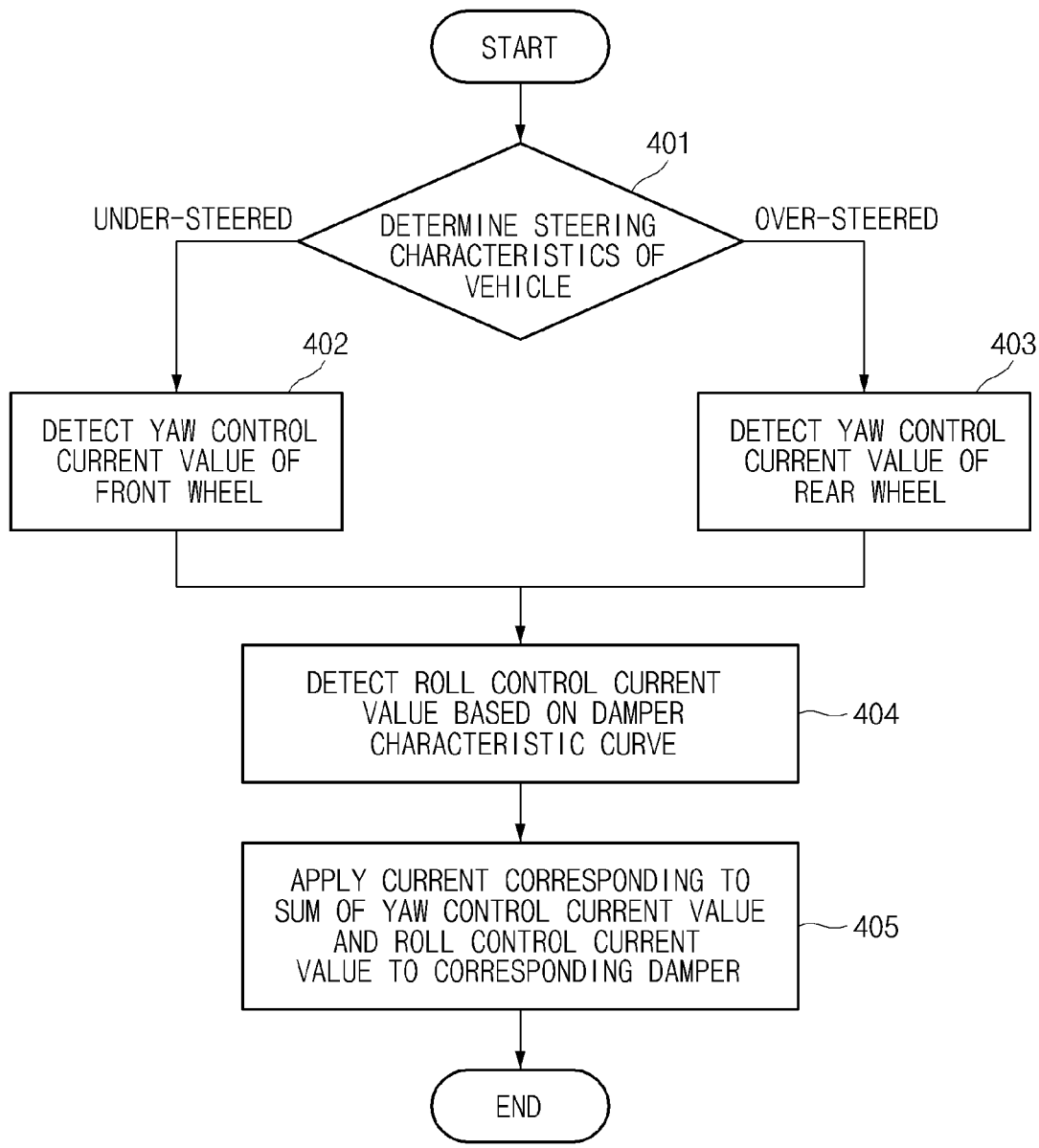
FIG. 4 is an exemplary flow chart illustrating a suspension control method according to an exemplary embodiment of the present invention.

FIG. 4 is an exemplary flow chart illustrating a suspension control method according to an exemplary embodiment of the present invention. First, the steering determining unit 40, executed by the controller, may be configured to determine steering characteristics of a vehicle (401). When the vehicle is in the under-steering as determined by the determination results (401), the yaw control current value detector 50 may be configured to calculate lateral force of front wheels, calculate normal force of the front wheels based on the lateral force, and subsequently detect a yaw control current value that corresponds to the normal force and a current damper velocity (402).

Furthermore, when the vehicle is in the over-steering as determined by the determination results (401), the yaw control current value detector 50 may be configured to calculate lateral force of rear wheels, calculate normal force of the rear wheels based on the lateral force, and subsequently detect a yaw control current value that corresponds to the normal force and a current damper velocity (403). Thereafter, the roll control current value detector 60 may be configured to detect a roll control current value based on a damper characteristic curve (404). The damper driver 70 may be configured to apply a current that corresponds to the sum of the yaw control current value and the roll control current value to the corresponding damper (405).

According to the exemplary embodiment of the present invention, steering characteristics (e.g., under-steering and over-steering) of a running vehicle may be analyzed to calculate lateral force of wheels, normal load (or normal force) of the wheels may be calculated based on the lateral force, and a current that corresponds to a total current value obtained by adding a current value (e.g., yaw control current value) that corresponds to the normal force and a roll control current value may be applied to a damper of the corresponding vehicles, to perform roll control and yaw control of the vehicle.

It should be interpreted that the scope of the present invention is defined by the following claims rather than the abovementioned detailed description and all modifications or alterations deduced from the meaning, the scope, and equivalences of the claims are included in the scope of the present invention.

What is claimed is:

1. A suspension control system comprising:
a memory configured to store program instructions; and
a processor configured to execute the program instructions, the program instructions when executed configured to:
store a distance from a vehicle center of mass to front wheels, a distance from the vehicle center of mass to rear wheels, a vehicle mass m, a wheel base L, and a tire lateral force deflection sensitivity coefficient K based on a change in a load;
store a yaw control current value based on a normal force and a damper velocity;
collect a steering angle, a vehicle speed u, a yaw rate γ, and lateral acceleration $\ddot{y}$;
determine steering characteristics of the vehicle;
calculate lateral force of all the front and rear wheels based on the steering characteristics;
calculate normal force of all the front and rear wheels based on the lateral force;
detect a yaw control current value that corresponds to the normal force and a current damper velocity;
detect a roll control current value based on a damper characteristic curve; and
apply a current that corresponds to the sum of the yaw control current value and the roll control current value to a corresponding damper.

2. The suspension control system according to claim 1, wherein the program instructions when executed are further configured to:
in response to determining that the vehicle is in the understeering, calculate lateral force of the front wheels, calculate normal force of the front wheels based on the lateral force of the front wheels, and detect a yaw control current value that corresponds to the normal force of the front wheels and the current damper velocity.

3. The suspension control system according to claim 2, wherein the lateral force $F_{yf0}$ of the front wheels is calculated based on Equation A below:

$$2Y_f = mg\frac{L_r}{L}\ddot{y} = F_{yf0} \qquad \text{Equation A}$$

wherein g is gravitational acceleration, m is the vehicle mass, L is the wheel base, $\ddot{y}$ is the lateral acceleration, and Lr is the distance from the vehicle center of mass to the rear wheels.

4. The suspension control system according to claim 3, wherein the normal force $\Delta F_{zf}$ of the front wheels is calculated based on Equation B below:

$$\Delta F_{zf} = \pm F_{zf0}\sqrt{\frac{1}{K}\frac{\Delta F_{yf}}{F_{yf0}}} = \qquad \text{Equation B}$$

-continued $$\pm mg\frac{L_r}{L}\sqrt{\frac{1}{K}\frac{\Delta F_{yf}}{mg\frac{L_r}{L}\ddot{y}}} = \pm\sqrt{\frac{1}{K}\frac{\Delta F_{yf}}{\ddot{y}}\frac{mgL_r}{L}}$$

wherein $\Delta F_{yf}$ is front wheel tire lateral force for creating additional yaw moment, K is the tire lateral force deflection sensitivity coefficient based on a change in a load, g is the gravitational acceleration, m is the vehicle mass, Lr is the distance from the vehicle center of mass to the rear wheels, L is the wheel base, $\ddot{y}$ is the lateral acceleration, and $F_{yf0}$ is the lateral force of the front wheels.

5. The suspension control system according to claim 2, wherein the lateral force $F_{yf0}$ of the front wheels is calculated based on Equation C below:

$$F_{yf0} = \frac{L_r}{L_f + L_r}m\gamma u \qquad \text{Equation C}$$

wherein Lf is the distance from the vehicle center of mass to the front wheels, γ is the yaw rate, m is the vehicle mass, u is the vehicle speed, and Lr is the distance from the vehicle center of mass to the rear wheels.

6. The suspension control system according to claim 5, wherein the normal force $\Delta F_{zf}$ of the front wheels is calculated based on Equation D below:

$$\Delta F_{zf} = \pm F_{zf0}\sqrt{\frac{1}{K}\frac{\Delta F_{yf}}{F_{yf0}}} = \pm g\sqrt{\frac{1}{K}\frac{\Delta F_{yf}}{\gamma u}\frac{L_r}{L_f + L_r}m} \qquad \text{Equation D}$$

wherein $\Delta F_{yf}$ is a front wheel tire lateral force for creating additional yaw moment, $L_f$ is the distance from the vehicle center of mass to the front wheels, γ is the yaw rate, m is the vehicle mass, g is the gravitational acceleration, K is the tire lateral force deflection sensitivity coefficient based on a change in a load, u is the vehicle speed, and Lr is the distance from the vehicle center of mass to the rear wheels.

7. The suspension control system according to claim 1, wherein the program instructions when executed are further configured to
in response to determining that the vehicle is in the oversteering, calculate lateral force of the rear wheels, calculate normal force of the rear wheels based on the lateral force of the rear wheels, and detect a yaw control current value that corresponds to the normal force of the rear wheels and the current damper velocity.

8. The suspension control system according to claim 7, wherein the lateral force $F_{yr0}$ of the rear wheels is calculated based on Equation E below:

$$2Y_r = mg\frac{L_f}{L}\ddot{y} = F_{yr0} \qquad \text{Equation E}$$

wherein g is gravitational acceleration, $\ddot{y}$ is the lateral acceleration m is the vehicle mass, L is the wheel base, and $L_f$ is the distance from the vehicle center of mass to the front wheels.

9. The suspension control system according to claim 8, wherein the normal force $\Delta F_{zf}$ of the rear wheels is calculated based on Equation F below:

$$\Delta F_{zr} = \pm F_{zr0}\sqrt{\frac{1}{K}\frac{\Delta F_{yr}}{F_{yr0}}} = \quad \text{Equation F}$$

$$\pm mg\frac{L_f}{L}\sqrt{\frac{1}{K}\frac{\Delta F_{yr}}{mg\frac{L_f}{L}\ddot{y}}} = \pm\sqrt{\frac{1}{K}\frac{\Delta F_{yr}}{\ddot{y}}\frac{mgL_f}{L}}$$

wherein $\Delta F_{yf}$ is rear wheel tire lateral force for creating additional yaw moment, $L_f$ is the distance from the vehicle center of mass to the front wheels, K is the tire lateral force deflection sensitivity coefficient based on a change in a load, g is the gravitational acceleration, m is the vehicle mass, L is the wheel base, $\ddot{y}$ is the lateral acceleration, and $F_{yr0}$ is the lateral force of the rear wheels.

10. The suspension control system according to claim 7, wherein the lateral force $F_{yf0}$ of the rear wheels is calculated based on Equation G below:

$$F_{yr0} = \frac{L_r}{L_f + L_r}m\gamma u \quad \text{Equation G}$$

wherein $L_f$ is the distance from the vehicle center of mass to the front wheels, γ is the yaw rate, m is the vehicle mass, u is the vehicle speed, and Lr is the distance from the vehicle center of mass to the rear wheels.

11. The suspension control system according to claim 10, wherein the normal force $\Delta F_{zr}$ of the rear wheels is calculated based on Equation H below:

$$\Delta F_{zr} = \pm F_{zr0}\sqrt{\frac{1}{K}\frac{\Delta F_{yr}}{F_{yr0}}} = \pm g\sqrt{\frac{1}{K}\frac{\Delta F_{yr}}{\gamma u}\frac{L_r}{L_f + L_r}m} \quad \text{Equation H}$$

wherein g is gravitational acceleration, $L_f$ is the distance from the vehicle center of mass to the front wheels, γ is the yaw rate, m is the vehicle mass, g is the gravitational acceleration, K is the tire lateral force deflection sensitivity coefficient based on a change in a load, u is the vehicle speed, and Lr is the distance from the vehicle center of mass to the rear wheel, and $\Delta F_{yr}$ is a rear wheel tire lateral force for creating additional yaw moment.

12. A suspension control method comprising:
determining, by a processor, steering characteristics of a vehicle;
in response to determining that the vehicle is in an understeering steering characteristic, calculating, by the processor, lateral force of front wheels, calculating, normal force of the front wheels based on the lateral force, and detecting a yaw control current value that corresponds to the normal force and a current damper velocity;
in response to determining that the vehicle is in an oversteering steering characteristic, calculating, by the processor, lateral force of rear wheels, calculating normal force of the rear wheels based on the lateral force, and detecting a yaw control current value that corresponds to the normal force and a current damper velocity;
detecting, by the processor, a roll control current value based on a damper characteristic curve; and
applying, by the processor, a current that corresponds to the sum of the yaw control current value and the roll control current value to a corresponding damper.

13. The suspension control method according to claim 12, wherein, the lateral force $F_{yf0}$ of the front wheels is calculated based on Equation A below:

$$2Y_f = mg\frac{L_r}{L}\ddot{y} = F_{yf0} \quad \text{Equation A}$$

wherein m is a vehicle mass, g is gravitational acceleration, Lr is a distance from a vehicle center of mass to the rear wheels, L is a wheel base, and $\ddot{y}$ is lateral acceleration.

14. The suspension control method according to claim 13, wherein the normal force $\Delta F_{zf}$ of the front wheels is calculated based on Equation B below:

$$\Delta F_{zf} = \pm F_{zf0}\sqrt{\frac{1}{K}\frac{\Delta F_{yf}}{F_{yf0}}} = \quad \text{Equation B}$$

$$\pm mg\frac{L_r}{L}\sqrt{\frac{1}{K}\frac{\Delta F_{yf}}{mg\frac{L_r}{L}\ddot{y}}} = \pm\sqrt{\frac{1}{K}\frac{\Delta F_{yf}}{\ddot{y}}\frac{mgL_r}{L}}$$

wherein K is a tire lateral force deflection sensitivity coefficient according to a change in a load, Lr is the distance from the vehicle center of mass to the rear wheels, g is the gravitational acceleration, m is the vehicle mass, L is the wheel base, $\ddot{y}$ is the lateral acceleration, and $F_{yf0}$ is a lateral force of the front wheels, and $\Delta F_{yf}$ is a front wheel tire lateral force for creating additional yaw moment.

15. The suspension control method according to claim 12, wherein the lateral force $F_{yr0}$ of the rear wheels is calculated based on Equation E below:

$$2Y_r = mg\frac{L_f}{L}\ddot{y} = F_{yr0} \quad \text{Equation E}$$

wherein m is a vehicle mass, g is gravitational acceleration, Lf is a distance from a vehicle center of mass to the front wheels, L is a wheel base, and $\ddot{y}$ is lateral acceleration.

16. The suspension control method according to claim 15, wherein the normal force $\Delta F_{zr}$ of the rear wheels is calculated based on Equation F below:

$$\Delta F_{zr} = \pm F_{zr0}\sqrt{\frac{1}{K}\frac{\Delta F_{yr}}{F_{yr0}}} = \quad \text{Equation F}$$

$$\pm mg\frac{L_f}{L}\sqrt{\frac{1}{K}\frac{\Delta F_{yr}}{mg\frac{L_f}{L}\ddot{y}}} = \pm\sqrt{\frac{1}{K}\frac{\Delta F_{yr}}{\ddot{y}}\frac{mgL_f}{L}}$$

wherein K is a tire lateral force deflection sensitivity coefficient according to a change in a load, $L_f$ is the distance from the vehicle center of mass to the front wheels, g is the gravitational acceleration, m is the vehicle mass, L is the wheel base, $\ddot{y}$ is the lateral acceleration, and $F_{yr0}$ is the lateral force of the rear wheels, and $\Delta F_{yr}$ is a rear wheel tire lateral force for creating additional yaw moment.

17. The suspension control method according to claim 12, wherein the lateral force $F_{yf0}$ of the front wheels is calculated based on Equation C below:

$$F_{yf0} = \frac{L_r}{L_f + L_r} m\gamma u \qquad \text{Equation C}$$

wherein $L_f$ is a distance from the vehicle center of mass to the front wheels, Lr is a distance from the vehicle center of mass to the rear wheels, m is a vehicle mass, γ is a yaw rate, and u is a vehicle speed.

18. The suspension control method according to claim 17, wherein the normal force $\Delta F_{zf}$ of the front wheels is calculated based on Equation D below:

$$\Delta F_{zf} = \pm F_{zf0}\sqrt{\frac{1}{K}\frac{\Delta F_{yf}}{F_{yf0}}} = \pm g\sqrt{\frac{1}{K}\frac{\Delta F_{yf}}{\gamma u}\frac{L_r}{L_f + L_r}m} \qquad \text{Equation D}$$

wherein $\Delta F_{yf}$ is a front wheel tire lateral force for creating additional yaw moment, $L_f$ is the distance from the vehicle center of mass to the front wheels, γ is the yaw rate, m is the vehicle mass, g is a gravitational acceleration, K is a tire lateral force deflection sensitivity coefficient based on a change in a load, u is the vehicle speed, and Lr is the distance from the vehicle center of mass to the rear wheel.

19. The suspension control method according to claim 12, wherein the lateral force $F_{yr0}$ of the rear wheels is calculated based on Equation G below:

$$F_{yr0} = \frac{L_r}{L_f + L_r} m\gamma u \qquad \text{Equation G}$$

wherein $L_f$ is a distance from the vehicle center of mass to the front wheels, Lr is a distance from the vehicle center of mass to the rear wheels, m is a vehicle mass, γ is a yaw rate, and u is a vehicle speed.

20. The suspension control method according to claim 19, wherein the normal force $\Delta F_{zr}$ of the rear wheels is calculated based on Equation H below:

$$\Delta F_{zr} = \pm F_{zr0}\sqrt{\frac{1}{K}\frac{\Delta F_{yr}}{F_{yr0}}} = \pm g\sqrt{\frac{1}{K}\frac{\Delta F_{yr}}{\gamma u}\frac{L_r}{L_f + L_r}m} \qquad \text{Equation H}$$

wherein g is gravitational acceleration, $L_f$ is the distance from the vehicle center of mass to the front wheels, γ is the yaw rate, m is the vehicle mass, K is a tire lateral force deflection sensitivity coefficient based on a change in a load, u is the vehicle speed, and Lr is the distance from the vehicle center of mass to the rear wheel, and $\Delta F_{yr}$ is a rear wheel tire lateral force for creating additional yaw moment.

21. A non-transitory computer readable medium containing program instructions executed by a processor, the computer readable medium comprising:
program instructions that store a distance from a vehicle center of mass to front wheels, a distance from the vehicle center of mass to rear wheels, a vehicle mass m, a wheel base L, and a tire lateral force deflection sensitivity coefficient K based on a change in a load;
program instructions that store a yaw control current value based on a normal force and a damper velocity;
program instructions that collect a steering angle, a vehicle speed u, a yaw rate γ, and lateral acceleration $\ddot{y}$;
program instructions that determine steering characteristics of the vehicle;
program instructions that calculate lateral force of all the front and rear wheels based on the steering characteristics;
program instructions that calculate normal force of all the front and rear wheels based on the lateral force;
program instructions that detect a yaw control current value that corresponds to the normal force and a current damper velocity;
program instructions that detect a roll control current value based on a damper characteristic curve; and
program instructions that apply a current that corresponds to the sum of the yaw control current value and the roll control current value to a corresponding damper.

22. The non-transitory computer readable medium of claim 21, further comprising:
program instructions that calculate lateral force of the front wheels, calculate normal force of the front wheels based on the lateral force, and detect a yaw control current value that corresponds to the normal force and the current damper velocity in response to determining that the vehicle is in the under-steering.

* * * * *